(12) United States Patent
Park (10) Patent No.: US 7,022,769 B2
(45) Date of Patent: Apr. 4, 2006

(54) DYNAMIC VULCANIZATION OF FLUOROCARBON ELASTOMERS

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 30 days.

(21) Appl. No.: 10/620,213

(22) Filed: Jul. 15, 2003

(65) Prior Publication Data

US 2005/0014900 A1  Jan. 20, 2005

(51) Int. Cl.
- C08F 8/00 (2006.01)
- C08F 214/26 (2006.01)
- C08L 23/00 (2006.01)
- C08L 23/04 (2006.01)
- C08L 27/12 (2006.01)

(52) U.S. Cl. ............... 525/191; 525/199; 525/200; 525/240

(58) Field of Classification Search ............ 525/191, 525/199, 200, 240
See application file for complete search history.

(56) References Cited

U.S. PATENT DOCUMENTS

| | | | |
|---|---|---|---|
| 3,037,954 A | 6/1962 | Gessler et al. | |
| 4,035,565 A | 7/1977 | Apotheker et al. | 526/249 |
| 4,287,320 A | 9/1981 | Kolb | 525/340 |
| 4,450,263 A | 5/1984 | West | 526/255 |
| 4,696,989 A | 9/1987 | Oka et al. | 526/254 |
| 4,787,991 A | 11/1988 | Morozumi et al. | 252/12.4 |
| 5,206,293 A * | 4/1993 | Sakai et al. | 525/194 |
| 5,354,811 A | 10/1994 | Kamiya et al. | 525/200 |
| 5,384,374 A | 1/1995 | Guerral et al. | 525/326.4 |
| 5,459,202 A * | 10/1995 | Martinez et al. | 525/200 |
| 5,548,028 A * | 8/1996 | Tabb | 525/194 |
| 5,700,866 A * | 12/1997 | Tabb | 524/520 |
| 6,066,697 A | 5/2000 | Coran et al. | 525/193 |
| 6,310,141 B1 | 10/2001 | Chen et al. | 529/199 |
| 6,407,174 B1 | 6/2002 | Ouhadi | 525/192 |
| 6,429,249 B1 | 8/2002 | Chen et al. | 524/432 |
| 6,437,030 B1 | 8/2002 | Coran et al. | 524/101 |
| 6,624,251 B1 * | 9/2003 | Chmielewski | 525/199 |

FOREIGN PATENT DOCUMENTS

| | | | |
|---|---|---|---|
| EP | 0168020 | 7/1985 | ............... 27/12 |
| EP | 0 168 020 B1 | 10/1989 | |

OTHER PUBLICATIONS

U.S. Appl. No. 09/597,050, filed Jun. 20, 2000, Chmielewski.

"Fluorine-Containing Polymers", Encyclopedia of Polymer Science & Engineering, vol. 7, 1987, Second Edition, pp. 256-267.

"Viton® fluoroelastomer, A Product of DuPont Dow Elastomers", Technical Information, DuPont Dow Elastomers, Copyright 1988.

Schmiegel, Walter W., "A Review of Recent Progress in the Design and Reactions of Base-Resistant Fluoroelastomers", IRC, Jul. 2003.

Michael J. Moore, "Silanes as Rubber-to-Metal Bonding Agents", 160th Meeting of the Rubber Division, American Chemical Society, Cleveland Ohio, Paper No. 105, pp. 1-17, 2001.

\* cited by examiner

Primary Examiner—Nathan M Nutter
(74) Attorney, Agent, or Firm—Ronald W. Wangerow; Harness, Dickey & Pierce, P.L.C.

(57) ABSTRACT

Processable rubber compositions contain a vulcanized fluorocarbon elastomer dispersed in a matrix of a non-fluorine containing thermoplastic polymeric material. In one embodiment the matrix forms a continuous phase and the vulcanized elastomeric material is in the form of particles forming a non-continuous phase. The compositions are made by combining a curative, an uncured fluorocarbon elastomer, and a thermoplastic material, and heating the mixture at a temperature and for a time sufficient to effect vulcanization of the elastomeric material, while mechanical energy is applied to mix the mixture during the heating step. Shaped articles such as seals, gaskets, O-rings, and hoses may be readily formed from the rubber compositions according to conventional thermoplastic processes such as blow molding, injection molding, and extrusion.

34 Claims, 1 Drawing Sheet

FIG - 1

DYNAMIC VULCANIZATION OF FLUOROCARBON ELASTOMERS

FIELD OF THE INVENTION

The present invention relates to thermoprocessable compositions containing cured fluorocarbon elastomers. It also relates to seal and gasket type material made from the compositions and methods for their production by dynamic vulcanization techniques.

BACKGROUND OF THE INVENTION

Cured elastomeric materials have a desirable set of physical properties typical of the elastomeric state. They show a high tendency to return to their original sized and shape following removal of a deforming force, and they retain physical properties after repeated cycles of stretching, including strain levels up to 1000%. Based on these properties, the materials are generally useful for making shaped articles such as seals and gaskets.

Because they are thermoset materials, cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

In today's automobile engines, the high temperatures of use have led to the development of a new generation of lubricants containing a high level of basic materials such as amines. Articles made from elastomeric materials, such as seals and gaskets, are in contact with such fluids during use, and are subject to a wide variety of challenging environmental conditions, including exposure to high temperature, contact with corrosive chemicals, and high wear conditions during normal use. Accordingly, it is desirable to make such articles from materials that combine elastomeric properties and stability or resistance to the environmental conditions.

To meet the demands of the new lubricant technology, a line of fluorocarbon elastomers has been developed highly resistant to the basic compounds found in the lubricating oils and greases. Specifically, cured elastomers based on copolymers of tetrafluoroethylene and propylene have met great commercial success. As a thermoset material, the cured fluorocarbon rubber is subject to the processing disadvantages noted above.

It would be desirable to provide an elastomeric or rubber composition that would combine a high level of chemical resistance with the advantages of thermoplastic processability. It would further be desirable to provide methods for formulating chemically resistant rubbers having such advantageous properties.

SUMMARY OF THE INVENTION

These and other advantages are achieved with a processable rubber composition containing a vulcanized elastomeric material dispersed in a matrix of a thermoplastic polymeric material. The elastomeric material comprises a synthetic, non-crystalline fluorine-containing polymeric material that exhibits elastomeric properties when crosslinked or vulcanized. In a preferred embodiment, the material contains repeating units derived from tetrafluoroethylene, at least one $C_{2-4}$ olefin, and optionally one or more additional fluorine-containing monomers. In another, the material contains repeating units derived from vinylidene fluoride, hexafluoropropylene, and optional other fluorine-containing monomers. In one embodiment the matrix forms a continuous phase and the vulcanized elastomeric material is in the form of particles forming a non-continuous phase.

A method for making a rubber composition comprises combining a curative, an elastomeric material as described above, and a thermoplastic material, and heating the mixture at a temperature and for a time sufficient to effect vulcanization of the elastomeric material, while mechanical energy is applied to mix the mixture during the heating step. The thermoplastic material comprises a polymeric material that softens and flows upon heating.

Shaped articles may be readily formed from the rubber compositions according to conventional thermoplastic processes such as blow molding, injection molding, and extrusion. Examples of useful articles include seals, gaskets, O-rings, and hoses.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Processable rubber compositions are provided that contain a vulcanized elastomeric material dispersed in a matrix. The vulcanized elastomeric material is the product of vulcanizing, crosslinking, or curing a fluorocarbon elastomer. The matrix is made of a thermoplastic material containing at least one non-fluorine containing thermoplastic polymer. The processable rubber compositions may be processed by conventional thermoplastic techniques to form shaped articles having physical properties that make them useful in a number of applications calling for elastomeric properties. In particular preferred embodiments, shaped articles made from the processable compositions typically exhibit a Shore A hardness of 50 or more, preferably Shore A 70 or more, typically in the range of Shore A 70 to Shore A 90. In addition or alternatively, the tensile strength of the shaped articles will preferably be 4 MPa or greater, preferably 8 MPa or greater, typically about 8–13 MPa. In still other embodiments, shaped articles may be characterized as having a modulus at 100% of at least 2 MPa, preferably at least about 4 MPa, and typically in the range of about 4–8 MPa. In other embodiments, elongation at break of articles made from the processable compositions of the invention will be 10% or greater, preferably at least about 50%, more preferably at least about 150%, and typically in the range of 150–300%. Shaped articles of the invention may be characterized as having at least one of hardness, tensile strength, modulus, and elongation at break in the above noted ranges.

In one embodiment, the fluorocarbon elastomer is a polymeric material containing repeating units derived from tetrafluoroethylene and from at least one $C_{2-4}$ olefin. In another embodiment, it contains repeating units derived from hexafluoropropylene, vinylidene difluoride, and optionally tetrafluoroethylene or other fluorine-containing monomer. In yet another embodiment, it contains repeating units derived from tetrafluoroethylene, perfluorovinylether, and optional other monomers. The matrix is made of a thermoplastic polymeric material.

In one aspect, the rubber compositions are made of two-phases where the matrix forms a continuous phase, and the vulcanized elastomeric material is in the form of particles forming a non-continuous, disperse, or discrete phase. In another aspect, the elastomeric material and the matrix form co-continuous phases.

In preferred embodiments, the compositions contain 35% by weight or more, and preferably 40% by weight or more of the elastomer phase, based on the total weight of elastomer and thermoplastic material. In other embodiments, the compositions contain 50% by weight or more of the elastomer phase. The compositions are homogenous blends of two phases that are sufficiently compatible that the compositions may readily be formed into shaped articles having sufficient elastomer properties, such as tensile strength, modulus, elongation at break, and compression set to be industrially useful as seals, gaskets, O-rings, hoses, and the like.

The elastomer phase may be present in the form of particles in a continuous thermoplastic phase, as a 3-D network forming a co-continuous phase with the thermoplastic material, or as a mixture of both. The particles or 3-D network of the elastomer phase preferably have minimum dimensions of 10 µm or less, and more preferably 1 µm or less.

The rubber composition of the invention may be made by dynamic vulcanization of a fluorocarbon elastomer in the presence of a thermoplastic component. In this embodiment, a method is provided for making the rubber composition, comprising combining a curative agent, an elastomeric material, and a thermoplastic material to form a mixture. The mixture is heated at a temperature and for a time sufficient to effect vulcanization or cure of the fluorocarbon elastomer in the presence of the thermoplastic material. Mechanical energy is applied to the mixture of elastomeric material, curative agent and thermoplastic material during the heating step. Thus the method of the invention provides for mixing the elastomer and thermoplastic components in the presence of a curative agent and heating during the mixing to effect cure of the elastomeric component. Alternatively, the elastomeric material and thermoplastic material may be mixed for a time and at a shear rate sufficient to form a dispersion of the elastomeric material in a continuous or co-continuous thermoplastic phase. Thereafter, a curative agent may be added to the dispersion of elastomeric material and thermoplastic material while continuing the mixing. Finally, the dispersion is heated while continuing to mix to produce the processable rubber composition of the invention.

The compositions of the invention are readily processable by conventional plastic processing techniques. In another embodiment, shaped articles are provided comprising the cured, fluorocarbon elastomers dispersed in a thermoplastic matrix. Shaped articles of the invention include, without limitation, seals, O-rings, gaskets, and hoses.

In a preferred embodiment, shaped articles prepared from the compositions of the invention exhibit an advantageous set of physical properties that includes a high degree of resistance to the effects of chemical solvents. In these embodiments, it is possible to provide articles for which the hardness, tensile strength, and/or the elongation at break change very little or change significantly less than comparable cured fluorocarbon elastomers or other known thermoplastic vulcanizates, when the articles are exposed for extended periods of time such as by immersion or partial immersion in organic solvents or fuels.

The fluorocarbon elastomer undergoes dynamic vulcanization in the presence of thermoplastic non-curing polymers to provide compositions with desirable rubber-like properties, but that can be thermally processed by conventional thermoplastic methods such as extrusion, blow molding, and injection molding. The elastomers are generally synthetic, non-crystalline polymers that exhibit rubber-like properties when crosslinked, cured, or vulcanized. As such, the cured elastomers, as well as the compositions of the invention made by dynamic vulcanization of the elastomers, are observed to substantially recover their original shape after removal of a deforming force, and show reversible elasticity up to high strain levels.

Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. The elastomer gums have viscosities that give a Mooney viscosity in the range generally of 15–160 (ML1+10, large rotor at 121° C.), which can be selected for a combination of flow and physical properties. Elastomer suppliers include Dyneon (3M), Asahi Glass Fluoropolymers, Solvay/Ausimont, Dupont, and Daikin.

In one embodiment, the elastomeric material may be described as a copolymer of tetrafluoroethylene and at least one $C_{2-4}$ olefin. As such, the elastomeric material comprises repeating units derived from tetrafluoroethylene and at least one $C_{2-4}$ olefin. Optionally, the elastomeric material may contain repeating units derived from one or more additional fluorine-containing monomers.

In a preferred embodiment, the elastomeric material comprises repeating units derived from 10–90 mole % tetrafluoroethylene, 10–90 mole % $C_{2-4}$ olefin, and up to 30 mole % of one or more additional fluorine-containing monomers. Preferably, the repeating units are derived from 25–90 mole % tetrafluoroethylene and 10–75 mole % $C_{2-4}$ olefin. In another preferred embodiment, the repeating units are derived from 45–65 mole % tetrafluoroethylene and 20–55 mole % $C_{2-4}$ olefin.

In particularly preferred embodiments, the molar ratio of tetrafluoroethylene units to $C_{2-4}$ olefin repeating units is from 60:40 to 40:60. In another embodiment, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene are commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from Dupont under the Viton® ETP trade name.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene. The elastomeric materials may be cured or crosslinked as described below to provide cured materials with rubber-like properties.

Chemically, in this embodiment the elastomeric material is made of copolymers of VDF and HFP, or of terpolymers of VDF, HFP, and tetrafluoroethylene (TFE), with optional cure site monomers. In preferred embodiments, they contain about 66 to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing pre-compounds.

In another embodiment, the elastomers can be described chemically as copolymers of TFE and PFVE, optionally as a terpolymer with VDF. The elastomer may further contain repeating units derived from cure site monomers.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

The fluorocarbon elastomers may also contain up to 5 mole % and preferably up to 3 mole % of repeating units derived from so-called cure site monomers that provide cure sites for vulcanization as discussed below. In one embodiment, the cure site repeating units are derived from bromine-containing olefin monomers. If used, preferably the repeating units of a bromine-containing olefin are present in a level to provide at least about 0.05% bromine in the polymer, preferably 0.3% bromine or more. In a preferred embodiment, the total weight of bromine in the polymer is 1.5 wt. % or less.

Bromine-containing olefin monomers useful to provide cure sites for fluoropolymers are disclosed for example in U.S. Pat. No. 4,035,565, the disclosure of which is incorporated by reference. Non-limiting examples of bromine-containing monomers include bromotrifluoroethylene and 4-bromo-3,3,4,4-tetrafluoro-1-butene. Additional non-limiting examples include vinyl bromide, 1-bromo-2,2-difluoroethylene, perfluoroalkyl bromide, 4-bromo-1,1,2-trifluorobutene, 4-bromo-1,1,3,3,4,4-hexafluorobutene, 4-bromo-3-chloro-1,1,3,4,4,-pentafluorobutene, 6-bromo-5,5,6,6-tetrafluorohexene, 4-bromoperfluorobutene-1, and 3,3-difluoroallyl bromide. As noted above, it is usually preferred that enough of the bromo-olefin repeating units be present to provide from about 0.3–1.5 wt. % bromine in the copolymer.

Other cure monomers may be used that introduce low levels, preferably less than or equal about 5 mole %, more preferably less than or equal about 3 mole %, of functional groups such as epoxy, carboxylic acid, carboxylic acid halide, carboxylic ester, carboxylate salts, sulfonic acid groups, sulfonic acid alkyl esters, and sulfonic acid salts. such monomers and cure are described for example in Kamiya et al., U.S. Pat. No. 5,354,811, the disclosure of which is hereby incorporated by reference.

The thermoplastic material making up the matrix includes at least one component that is a non-fluorine containing thermoplastic polymer. The polymeric material softens and flows upon heating. In one aspect, a thermoplastic material is one the melt viscosity of which can be measured, such as by ASTM D-1238 or D-2116, at a temperature above its melting point The thermoplastic material of the invention may be selected to provide enhanced properties of the rubber/thermoplastic combination at elevated temperatures, preferably above 100° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured fluorocarbon elastomer (rubber) at a comparable temperature.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by $(A-B)_n$, where A represents the hard segments and B the soft segments as described above.

Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a preferred embodiment, a thermoplastic elastomer is used that has alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. Preferably, the materials are crystalline or semi-crystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature or glass transition temperature in the range from about 80° C. to about 350° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics.

Polyolefins are formed by polymerizing a-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

In a preferred embodiment, the matrix comprises at least one non-fluorine containing thermoplastic, such as those described above. Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Other examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoroolefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene.

Thermoplastic terpolymers may also be used. These include thermoplastic terpolymers of TFE, HFP, and vinylidene fluoride.

These and other fluorine-containing thermoplastic materials are commercially available. Suppliers include Dyneon (3M), Daikin, Asahi Glass Fluoroplastics, Solvay/Ausimont and DuPont

Useful curative agents include diamines, peroxides, and polyol/onium salt combinations. Diamine curatives have been known since the 1950's. Diamine curatives are relatively slow curing, but offer advantages in several areas. Such curatives are commercially available, for example as Diak-1 from DuPont Dow Elastomers.

Preferred peroxide curative agents are organic peroxides, preferably dialkyl peroxides. In general, an organic peroxide may be selected to function as a curing agent for the composition in the presence of the other ingredients and under the temperatures to be used in the curing operation without causing any harmful amount of curing during mixing or other operations which are to precede the curing operation. A dialkyl peroxide which decomposes at a temperature above 49° C. is especially preferred when the composition is to be subjected to processing at elevated temperatures before it is cured. In many cases one will prefer to use a di-tertiarybutyl peroxide having a tertiary carbon atom attached to a peroxy oxygen. Non-limiting examples include 2,5-dimethyl-2,5-di(tert-butylperoxy)-3-hexyne; 2,5-dimethyl-2,5-di(tert-butylperoxy) hexane; and 1,3-bis-(t-butylperoxyisopropyl)benzene. Other non-limiting examples of peroxide curative agent include dicumyl peroxide, dibenzoyl peroxide, tertiary butyl perbenzoate, di[1, 3-dimethyl-3-(t-butylperoxy)butyl]carbonate, and the like.

One or more crosslinking co-agents may be combined with the peroxide. Examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

where
Q is nitrogen or phosphorus;
Z is a hydrogen atom or is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula —$CY_2$COOR' where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;
$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols incude aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the Formula wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol formula III that the —OH groups can be attached in any position (other than number one) in either ring. Blends of two or more such compounds can also be used. A preferred bisphenol compound is Bisphenol AF, which is 2,2-bis(4-hydroxyphenyl)hexafluoropropane. Other non-limiting examples include 4,4'-dihydroxydiphenyl sulfone (Bisphenol S) and 2,2-bis(4-hydroxyphenyl) propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins. U.S. Pat. Nos. 2,972,600 and 3,287,440 are incorporated herein in this regard. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents may be represented by the general formula where Q is a divalent radical selected from the group consisting of —$CH_2$— and —$CH_2$—O—$CH_2$—; m is zero or a positive integer from 1 to 20 and R' is hydrogen or an organic radical. Preferably, Q is the divalent radical —$CH_2$—O—$CH_2$—, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425, which is incorporated herein by reference.

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the thermoplastic and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$–$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include $Ca(OH)_2$, MgO, CaO, and ZnO.

Non-limiting examples of fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar). Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In a preferred embodiment, fillers such as carboxy block may make up to about 40% by weight of the total weight of the compositions of the invention. Preferably, the compositions comprise 1–40 weight % of filler. In other embodiments, the filler makes up 10 to 25 weight % of the compositions.

The vulcanized elastomeric material, also referred to herein generically as a "rubber", is generally present as small particles within a continuous thermoplastic polymer matrix. A co-continuous morphology is also possible depending on the amount of elastomeric material relative to thermoplastic material, the cure system, and the mechanism and degree of cure of the elastomer and the amount and degree of mixing. Preferably, the elastomeric material is fully crosslinked/cured.

Full crosslinking can be achieved by adding an appropriate curative or curative system to a blend of thermoplastic material and elastomeric material, and vulcanizing or curing the rubber to the desired degree under vulcanizing conditions. In a preferred embodiment, the elastomer is crosslinked by the process of dynamic vulcanization. The term dynamic vulcanization refers to a vulcanization or curing process for a rubber (here a fluorocarbon elastomer) contained in a thermoplastic composition, wherein the curable rubber is vulcanized under conditions of sufficiently high shear at a temperature above the melting point of the thermoplastic component. The rubber is thus simultaneously crosslinked and dispersed within the thermoplastic matrix. Dynamic vulcanization is effected by applying mechanical energy to mix the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (typically 120° C.) to about 300° C. or more. Typically, the range is from about 150° C. to about 250° C. A preferred range of vulcanization temperatures is from about 180° C. to about 220° C. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained, wherein the rubber is in the form of small dispersed particles essentially of an average particle size smaller than about 50 μm, preferably of an average particle size smaller than about 25 μm. More typically and preferably, the particles have an average size of about 10 μm or less, preferably about 5 μm or less, and more preferably about 1 μm or less. In other embodiments, even when the average particle size is larger, there will be a significant number of cured elastomer particles less than 1 μm in size dispersed in the thermoplastic matrix.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

Figure 1:
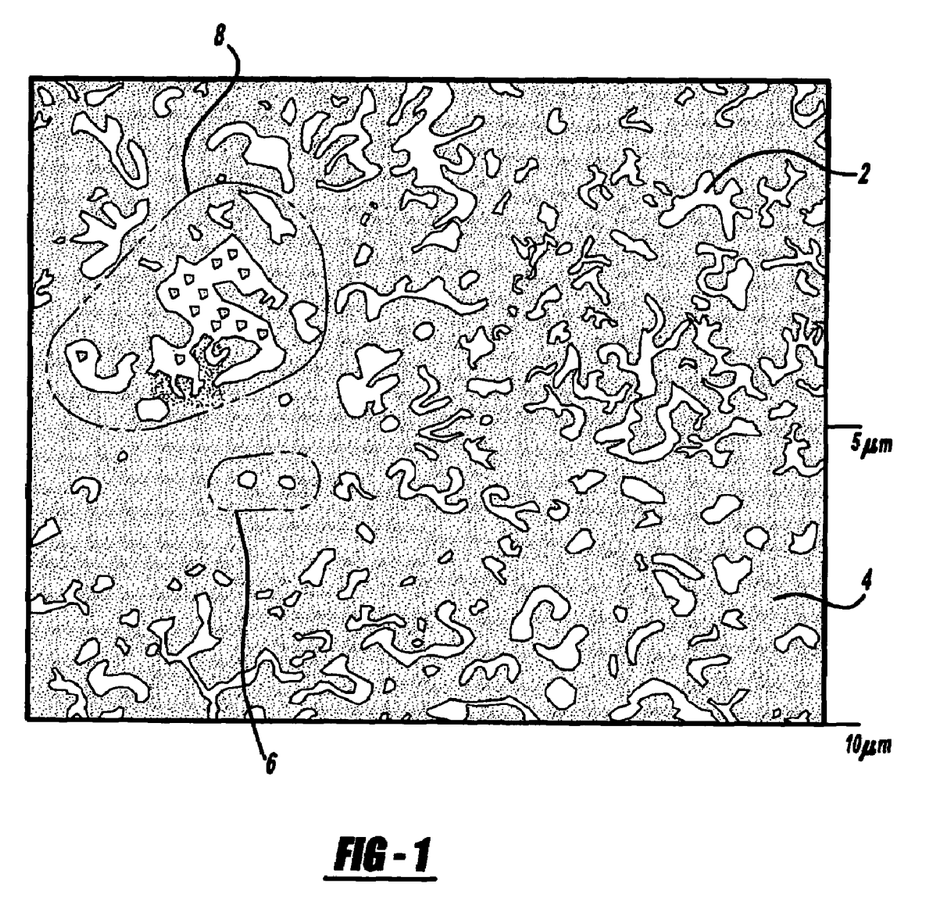
FIG. 1 is an atomic force micrograph of a microtomed cross section of shaped article of the invention.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

Where some of the cured elastomer is in a co-continuous phase with the thermoplastic, the particle size referred to above is understood to refer to the dimensions of features in two-dimensional cross sections such as FIG. 1.

FIG. 1 is an atomic force micrograph of a shaped article produced by injection molding a processable rubber composition according to the invention (see Example 19). The micrograph shows hard and soft regions of the article at a resolution such that features of dimensions 1 µm and less may readily be seen. Lighter portions 2 represent soft areas, which are made of the cured fluorocarbon elastomer. Darker portions 4 represent hard areas corresponding to the thermoplastic material. In a feature not shown in Figure, associated with the soft areas are small hard points that show as dark dots in the micrographs. The dark dots correspond to filler such as carbon black that is present along with the elastomer during the dynamic vulcanization process.

Some features 6 of the micrograph suggest the elastomer is present as a particle surrounded by a "sea" of thermoplastic material. For these cases, the structure can be interpreted as the cured fluorocarbon elastomer particles being present as discrete, non-continuous phase dispersed in a continuous thermoplastic phase. Other features 8 of the micrograph may be better interpreted as showing a cross section of an elastomer phase dispersed as a 3-D network in the thermoplastic matrix, suggesting co-continuous phases. For both features 6 and 8, it is evident that the dimensions of the structures are on the order of 10 µm or less, with many particles or other structures having a size of 1 µm or less.

From two-dimensional cross sections, it may be difficult to determine whether the elastomer phase is in the form of particles surrounded by a continuous thermoplastic phase, or is rather present as a three-dimensional network forming a co-continuous phase, or is present as a mixture of both. Nevertheless, the cross sections demonstrate that the dimensions of the "particles" are much smaller than those that can be achieved by simply mixing ground rubber particles into a thermoplastic material as a filler.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases. It is believed such compatibility results from the dynamic vulcanization process. During the process, the elastomeric particles are being crosslinked or cured while the two phases are being actively mixed and combined. In addition, the higher temperature and the presence of reactive crosslinking agent may lead to some physical or covalent linkages between the two phases. At the same time, the process leads to a finer dispersion of the discrete or co-continuous elastomer phase in the thermoplastic than is possible with simple filling.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process.

In a batch process, predetermined charges of elastomeric material, thermoplastic material and curative agents are added to a mixing apparatus. In a typical batch procedure, the elastomeric material and thermoplastic material are first mixed, blended, masticated or otherwise physically combined until a desired particle size of elastomeric material is provided in a continuous phase of thermoplastic material. When the structure of the elastomeric material is as desired, a curative agent may be added while continuing to apply mechanical energy to mix the elastomeric material and thermoplastic material. Curing is effected by heating or continuing to heat the mixing combination of thermoplastic and elastomeric material in the presence of the curative agent. When cure is complete, the processable rubber composition may be removed from the reaction vessel (mixing chamber) for further processing.

It is preferred to mix the elastomeric material and thermoplastic material at a temperature where the thermoplastic material softens and flows. If such a temperature is below that at which the curative agent is activated, the curative agent may be a part of the mixture during the initial particle dispersion step of the batch process. In some embodiments, a curative is combined with the elastomeric and polymeric material at a temperature below the curing temperature. When the desired dispersion is achieved, the temperature may be increased to effect cure. In one embodiment, commercially available elastomeric materials are used that contain a curative pre-formulated into the elastomer. However, if the curative agent is activated at the temperature of initial mixing, it is preferred to leave out the curative until the desired particle size distribution of the elastomeric material in the thermoplastic matrix is achieved. In another embodiment, curative is added after the elastomeric and thermoplastic material are mixed. In a preferred embodiment, the curative agent is added to a mixture of elastomeric particles in thermoplastic material while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, thermoplastic material and elastomeric material are combined by inserting them into the screw extruder together from a first hopper using a feeder (loss-in-weight or volumetric feeder). Temperature and screw parameters may be adjusted to provide a proper temperature and shear to effect the desired mixing and particle size distribution of an uncured elastomeric component in a thermoplastic material matrix. The duration of mixing may be controlled by providing a longer or shorter length of extrusion apparatus or by controlling the speed of screw rotation for the mixture of elastomeric material and thermoplastic material to go through during the mixing phase. The degree of mixing may also be controlled by the mixing screw element configuration in the screw shaft, such as intensive, medium or mild screw designs. Then, at a downstream port, by using side feeder (loss-in-weight or volumetric feeder), the curative agent may be added continuously to the mixture of thermoplastic material and elastomeric material as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative agent, processable rubber compositions of the invention may be made in a continuous process. As in the batch process, the elastomeric material may be commercially formulated to contain a curative agent, generally a phenol or phenol resin curative.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, more preferably at least about 40 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 95 percent by weight, more preferably from about 40 to about 90 weight percent, and more preferably from about 50 to about 80 percent by weight of the total weight of the rubber and the thermoplastic polymer combined.

The amount of thermoplastic polymer within the processable rubber compositions of the invention is generally from about 5 to about 95 percent by weight, preferably from about 10 to about 65 percent by weight and more preferably from about 20 to about 50 percent by weight of the total weight of the rubber and the thermoplastic combined.

As noted above, the processable rubber compositions and shaped articles of the invention include a cured rubber and a thermoplastic polymer. Preferably, the thermoplastic vulcanizate is a homogeneous mixture wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 μm, more preferably smaller than about 25 μm, even more preferably smaller than about 10 μm or less, and still more preferably smaller than about 5 μm.

Advantageously, the shaped articles of the invention are rubber-like materials that, unlike conventional rubbers, can be processed and recycled like thermoplastic materials. These materials are rubber like to the extent that they will retract to less than 1.5 times their original length within one minute after being stretched at room temperature to twice its original length and held for one minute before release, as defined in ASTM D1566. Also, these materials satisfy the tensile set requirements set forth in ASTM D412, and they also satisfy the elastic requirements for compression set per ASTM D395.

The reprocessability of the rubber compositions of the invention may be exploited to provide a method for reducing the costs of a manufacturing process for making shaped rubber articles. The method involves recycling scrap generated during the manufacturing process to make other new shaped articles. Because the compositions of the invention and the shaped articles made from the compositions are thermally processable, scrap may readily be recycled for re-use by collecting the scrap, optionally cutting, shredding, grinding, milling, otherwise comminuting the scrap material, and re-processing the material by conventional thermoplastic techniques. Techniques for forming shaped articles from the recovered scrap material are in general the same as those used to form the shaped articles—the conventional thermoplastic techniques include, without limitation, blow molding, injection molding, compression molding, and extrusion.

The re-use of the scrap material reduces the costs of the manufacturing process by reducing the material cost of the method. Scrap may be generated in a variety of ways during a manufacturing process for making shaped rubber articles. For example, off-spec materials may be produced. Even when on-spec materials are produced, manufacturing processes for shaped rubber articles tend to produce waste, either through inadvertence or through process design, such as the material in sprues of injection molded parts. The re-use of such materials through recycling reduces the material and thus the overall costs of the manufacturing process.

For thermoset rubbers, such off spec materials usually can not be recycled into making more shaped articles, because the material can not be readily re-processed by the same techniques as were used to form the shaped articles in the first place. Recycling efforts in the case of thermoset rubbers are usually limited to grinding up the scrap and the using the grinds as raw material in a number products other than those produced by thermoplastic processing technique The description of the invention is merely exemplary in nature and, thus, variations that do not depart from the gist of the invention are intended to be within the scope of the invention. Such variations are not to be regarded as a departure from the spirit and scope of the invention.

EXAMPLES

In Examples 1–10, the following materials are used:

AFLAS MZ is a copolymer elastomer of tetrafluoroethylene and propylene, sold by Asahi Glass Company. It is supplied by Asahi pre-formulated with a phenol crosslinking compound.

AFLAS SZ is another grade of TFE/propylene elastomer pre-formulated with a phenol crosslinking compound.

AFLAS SP is a copolymer elastomer of tetrafluoroethylene and propylene. It is formulated without a crosslinking compound.

Hytrel is Hytrel 4556, 5526 or 8139, a thermoplastic elastomer comprising blocks of polyester and blocks of polyether, sold by DuPont.

MT Black is a carbon black filler.

MgO is magnesium oxide, which acts as an acid accepting curing accelerator.

$Ca(OH)_2$ is calcium hydroxide, another acid accepting curing accelerator.

Pebax is Pebax MX 1205, 4033, MV 1074, or MH 1657, grades of a thermoplastic elastomer having blocks of polyamide and blocks of polyether, sold by Atofina.

Nylon is ultramid A (nylon 66), ultramid B (nylon 6) or ultramid C (PA 6/66 copolymer).

Polyester is PET (polyethylene terephthalate) from Eastman Chemical (Eastar) or PBT (polybutylene terephthalate) from BASF (Ultradur).

Polypropylene is Profax from Himont (now Basell).

Examples 1–10 demonstrate dynamic vulcanization of copolymers of tetrafluoroethylene and propylene in the presence of a variety of thermoplastic elastomers and semi-crystalline thermoplastic materials. The AFLAS materials are used at a level of 100 parts, and the thermoplastic materials are used at levels between 25 parts per hundred AFLAS to 125 parts per hundred parts of the AFLAS material.

To demonstrate a batch process, the ingredients are mixed in a Brabender mixer according to the following procedure. The thermoplastic material (Hytrel, Pebax, nylon, polyester, or polypropylene) is melted in a Brabender mixer and stirred. To the molten stirring thermoplastic material is added the AFLAS MZ or AFLAS SZ, along with the MT Black. Mixing continues at the melting point of the thermoplastic material for a further 10–20 minutes, preferably at a temperature of about 120–180° C. Then, the curing accelerators MgO and Ca(OH)$_2$ are added and the mixing and heating continued for a further 10 minutes. The vulcanized material is cooled down and removed from the Brabender mixer. Shaped articles may be prepared from the vulcanized composition by conventional compression molding, injection molding, extrusion, and the like. Plaques may be fabricated from the vulcanized composition for measurement of physical properties.

For Examples 11–15, using AFLAS SP, process is similar, except that the peroxide crosslinking material is added at the same time as the curing accelerators MgO and Ca(OH)$_2$ are added.

Examples 16a–e—Continuous Process in a Twin Screw Extruder.

The ingredients for Examples 16a–e are the same as for Examples 7a–e. The barrel of a W&P ZSK-25 model twin screw extruder was heated at 240° C. A mixture of chopped AFLAS SZ elastomer and Pebax plastic pellets was added into the main hopper using a K-tron feeder while turning the screw at 150 rpm. A mixture of the carbon black (MT Black), MgO, Ca(OH)$_2$ and peroxide powder was added using a K-tron side feeder through the downstream side feeding part of the extruder. Strands were extruded through a 2-hole die through a water cooling tank, and cut into pellets with the pelletizer.

| Ingredient | Example 1a pphr | g | Example 1b pphr | g | Example 1c pphr | g | Example 1d pphr | g | Example 1e pphr | g |
|---|---|---|---|---|---|---|---|---|---|---|
| AFLAS MZ | 100.0 | 195.7 | 100.0 | 158.1 | 100.0 | 129.4 | 100.0 | 115.7 | 100.0 | 104.6 |
| Hytrel | 25.0 | 48.9 | 50.0 | 79.0 | 75.0 | 97.1 | 100.0 | 115.7 | 125.0 | 130.8 |
| MT Black | 30.0 | 58.7 | 30.0 | 47.4 | 30.0 | 38.8 | 30.0 | 34.7 | 30.0 | 31.4 |
| MgO | 3.0 | 5.9 | 3.0 | 4.7 | 3.0 | 3.9 | 3.0 | 3.5 | 3.0 | 3.1 |
| Ca(OH)$_2$ | 3.0 | 5.9 | 3.0 | 4.7 | 3.0 | 3.9 | 3.0 | 3.5 | 3.0 | 3.1 |

| Ingredient | Example 2a pphr | g | Example 2b pphr | g | Example 2c pphr | g | Example 2d pphr | g | Example 2e pphr | g |
|---|---|---|---|---|---|---|---|---|---|---|
| AFLAS MZ | 100.0 | 195.7 | 100.0 | 158.1 | 100.0 | 129.4 | 100.0 | 115.7 | 100.0 | 104.6 |
| Pebax | 25.0 | 48.9 | 50.0 | 79.0 | 75.0 | 97.1 | 100.0 | 115.7 | 125.0 | 130.8 |
| MT Black | 30.0 | 58.7 | 30.0 | 47.4 | 30.0 | 38.8 | 30.0 | 34.7 | 30.0 | 31.4 |
| MgO | 3.0 | 5.9 | 3.0 | 4.7 | 3.0 | 3.9 | 3.0 | 3.5 | 3.0 | 3.1 |
| Ca(OH)$_2$ | 3.0 | 5.9 | 3.0 | 4.7 | 3.0 | 3.9 | 3.0 | 3.5 | 3.0 | 3.1 |

| Ingredient | Example 3a pphr | g | Example 3b pphr | g | Example 3c pphr | g | Example 3d pphr | g | Example 3e pphr | g |
|---|---|---|---|---|---|---|---|---|---|---|
| AFLAS MZ | 100.0 | 195.7 | 100.0 | 158.1 | 100.0 | 129.4 | 100.0 | 115.7 | 100.0 | 104.6 |
| Nylon | 25.0 | 48.9 | 50.0 | 79.0 | 75.0 | 97.1 | 100.0 | 115.7 | 125.0 | 130.8 |
| MT Black | 30.0 | 58.7 | 30.0 | 47.4 | 30.0 | 38.8 | 30.0 | 34.7 | 30.0 | 31.4 |
| MgO | 3.0 | 5.9 | 3.0 | 4.7 | 3.0 | 3.9 | 3.0 | 3.5 | 3.0 | 3.1 |
| Ca(OH)$_2$ | 3.0 | 5.9 | 3.0 | 4.7 | 3.0 | 3.9 | 3.0 | 3.5 | 3.0 | 3.1 |

| Ingredient | Example 4a pphr | g | Example 4b pphr | g | Example 4c pphr | g | Example 4d pphr | g | Example 4e pphr | g |
|---|---|---|---|---|---|---|---|---|---|---|
| AFLAS MZ | 100.0 | 195.7 | 100.0 | 158.1 | 100.0 | 129.4 | 100.0 | 115.7 | 100.0 | 104.6 |
| Polyester | 25.0 | 48.9 | 50.0 | 79.0 | 75.0 | 97.1 | 100.0 | 115.7 | 125.0 | 130.8 |
| MT Black | 30.0 | 58.7 | 30.0 | 47.4 | 30.0 | 38.8 | 30.0 | 34.7 | 30.0 | 31.4 |
| MgO | 3.0 | 5.9 | 3.0 | 4.7 | 3.0 | 3.9 | 3.0 | 3.5 | 3.0 | 3.1 |
| Ca(OH)$_2$ | 3.0 | 5.9 | 3.0 | 4.7 | 3.0 | 3.9 | 3.0 | 3.5 | 3.0 | 3.1 |

| Ingredient | Example 5a pphr | g | Example 5b pphr | g | Example 5c pphr | g | Example 5d pphr | g | Example 5e pphr | g |
|---|---|---|---|---|---|---|---|---|---|---|
| AFLAS MZ | 100.0 | 195.7 | 100.0 | 158.1 | 100.0 | 129.4 | 100.0 | 115.7 | 100.0 | 104.6 |
| Polyproplene | 25.0 | 48.9 | 50.0 | 79.0 | 75.0 | 97.1 | 100.0 | 115.7 | 125.0 | 130.8 |
| MT Black | 30.0 | 58.7 | 30.0 | 47.4 | 30.0 | 38.8 | 30.0 | 34.7 | 30.0 | 31.4 |
| MgO | 3.0 | 5.9 | 3.0 | 4.7 | 3.0 | 3.9 | 3.0 | 3.5 | 3.0 | 3.1 |
| Ca(OH)$_2$ | 3.0 | 5.9 | 3.0 | 4.7 | 3.0 | 3.9 | 3.0 | 3.5 | 3.0 | 3.1 |

-continued

| Ingredient | Example 6a pphr | g | Example 6b pphr | g | Example 6c pphr | g | Example 6d pphr | g | Example 6e pphr | g |
|---|---|---|---|---|---|---|---|---|---|---|
| AFLAS SP | 100.0 | 190.9 | 100.0 | 154.8 | 100.0 | 127.0 | 100.0 | 113.8 | 100.0 | 103.0 |
| Hytrel | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 7a pphr | g | Example 7b pphr | g | Example 7c pphr | g | Example 7d pphr | g | Example 7e pphr | g |
|---|---|---|---|---|---|---|---|---|---|---|
| AFLAS SP | 100.0 | 190.9 | 100.0 | 154.8 | 100.0 | 127.0 | 100.0 | 113.8 | 100.0 | 103.0 |
| Pebax | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.7 | 3.0 | 5.7 | 3.0 | 5.7 | 3.0 | 5.7 | 3.0 | 5.7 |

| Ingredient | Example 8a pphr | g | Example 8b pphr | g | Example 8c pphr | g | Example 8d pphr | g | Example 8e pphr | g |
|---|---|---|---|---|---|---|---|---|---|---|
| AFLAS SP | 100.0 | 190.9 | 100.0 | 154.8 | 100.0 | 127.0 | 100.0 | 113.8 | 100.0 | 103.0 |
| Nylon | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 9a pphr | g | Example 9b pphr | g | Example 9c pphr | g | Example 9d pphr | g | Example 9e pphr | g |
|---|---|---|---|---|---|---|---|---|---|---|
| AFLAS SP | 100.0 | 190.9 | 100.0 | 154.8 | 100.0 | 127.0 | 100.0 | 113.8 | 100.0 | 103.0 |
| Polyester | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 10a pphr | g | Example 10b pphr | g | Example 10c pphr | g | Example 10d pphr | g | Example 10e pphr | g |
|---|---|---|---|---|---|---|---|---|---|---|
| AFLAS SP | 100.0 | 190.9 | 100.0 | 154.8 | 100.0 | 127.0 | 100.0 | 113.8 | 100.0 | 103.0 |
| Polypropylene | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

-continued

| Ingredient | Example 11a | | Example 11b | | Example 11c | | Example 11d | | Example 11e | |
|---|---|---|---|---|---|---|---|---|---|---|
| | pphr | g | pphr | g | pphr | g | pphr | g | pphr | g |
| AFLAS SP | 100.0 | 190.9 | 100.0 | 154.8 | 100.0 | 127.0 | 100.0 | 113.8 | 100.0 | 103.0 |
| Hytrel | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 12a | | Example 12b | | Example 12c | | Example 12d | | Example 12e | |
|---|---|---|---|---|---|---|---|---|---|---|
| | pphr | g | pphr | g | pphr | g | pphr | g | pphr | g |
| AFLAS SP | 100.0 | 190.9 | 100.0 | 154.8 | 100.0 | 127.0 | 100.0 | 113.8 | 100.0 | 103.0 |
| Pebax | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 13a | | Example 13b | | Example 13c | | Example 13d | | Example 13e | |
|---|---|---|---|---|---|---|---|---|---|---|
| | pphr | g | pphr | g | pphr | g | pphr | g | pphr | g |
| AFLAS SP | 100.0 | 190.9 | 100.0 | 154.8 | 100.0 | 127.0 | 100.0 | 113.8 | 100.0 | 103.0 |
| Nylon | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 14a | | Example 14b | | Example 14c | | Example 14d | | Example 14e | |
|---|---|---|---|---|---|---|---|---|---|---|
| | pphr | g | pphr | g | pphr | g | pphr | g | pphr | g |
| AFLAS SP | 100.0 | 190.9 | 100.0 | 154.8 | 100.0 | 127.0 | 100.0 | 113.8 | 100.0 | 103.0 |
| Polyester | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

| Ingredient | Example 15a | | Example 15b | | Example 15c | | Example 15d | | Example 15e | |
|---|---|---|---|---|---|---|---|---|---|---|
| | pphr | g | pphr | g | pphr | g | pphr | g | pphr | g |
| AFLAS SP | 100.0 | 190.9 | 100.0 | 154.8 | 100.0 | 127.0 | 100.0 | 113.8 | 100.0 | 103.0 |
| Polypropylene | 25.0 | 47.7 | 50.0 | 77.4 | 75.0 | 95.2 | 100.0 | 113.8 | 125.0 | 128.8 |
| MT Black | 30.0 | 57.3 | 30.0 | 46.4 | 30.0 | 38.1 | 30.0 | 34.1 | 30.0 | 30.9 |
| MgO | 3.0 | 5.7 | 3.0 | 4.6 | 3.0 | 3.8 | 3.0 | 3.4 | 3.0 | 3.1 |
| Ca(OH)$_2$ | 6.0 | 11.5 | 6.0 | 9.3 | 6.0 | 7.6 | 6.0 | 6.8 | 6.0 | 6.2 |
| 1,3-bis (t-butyl peroxyisopropyl) benzene | 1.0 | 1.9 | 1.0 | 1.5 | 1.0 | 1.3 | 1.0 | 1.1 | 1.0 | 1.0 |
| triallyl isocyanurate | 3.0 | 5.9 | 3.0 | 5.9 | 3.0 | 5.9 | 3.0 | 5.9 | 3.0 | 5.9 |

Examples 17–18

Viton F605C is a VDF/HFP/TFE terpolymer elastomer from DuPont Dow Elastomers.

Genestar PA9T is C9 diamine based aromatic polyamide. It is a high temperature polyamide based on a copolymer of terephthalic acid and nonanediamine, commercially available from Kuraray.

Dyneon FE 5840 is a terpolymer elastomer of VDF/HFP/TFE, from Dyneon (3M).

Dyneon BRE 7231X is a base resistant elastomer, based on a terpolymer of TFE, propylene, and VDF, commercially available from Dyneon (3M).

Rhenofit CF is a calcium hydroxide crosslinker for fluoroelastomers, from Rhein Chemie.

Elastomag 170 is a high activity powdered magnesium oxide from Rohm and Haas.

MT Black (N990) is carbon black.

Struktol WS-280 is a silane coupling agent from Struktol.

Technoflon FPA-1 is a functionalized perfluoropolyether from Ausimont.

Examples 17–19 were carried out in a batch process in a Brabender mixer. The thermoplastic polymer is melted in the batch mixer at about 240° C. The elastomer is then added. The blend of elastomer and thermoplastic is stirred about 10–15 minutes at 50 rpm. Then the curative, curing accelerator, processing aids, and carbon black are added while continuing to stir. Stirring is continued until the mixture is homogenously mixed and cure is complete (typically an additional 10 minutes at 240° C. and 50 rpm). Material is cooled, removed from the mixer, and fabricated into plaques for tensile strength measurements.

conditions of Examples 17–18. The fluorocarbon elastomer made up 44.4% by weight of the total elastomer and thermoplastic combined. The processable rubber composition was molded into a tensile bar for testing of tensile strength and elongation at break.

The middle portion of the tensile bar was cut out of the bar and encased in a ½ inch block of epoxy. The block was taken down to liquid nitrogen temperature, and the shaped article was microtomed to produce a specimen for analysis with an atomic force microscope (AFM).

The AFM was used in intermittent contact mode, permitting phase and topography images to be obtained simultaneously. Resolution was 1024 data points per scan line and 1024 lines per image. The scan rate was 2 Hz, and the X and Y axis were set at 20 µm by 20 µm. A built-in image analyzer allowed the total for each domain to be calculated. The amount of cured rubber phase was analyzed to be 42.4% by area of the cross section shown in FIG. 1.

FIG. 1 shows a pictorial representation of a 10 µm×10 µm section of an AFM scan illustrating the two-phase structure of the shaped article of Example 19. The darker areal portion is a harder area, corresponding to the thermoplastic; the lighter portions are softer areas, corresponding to the rubbery cured elastomer material. Yet darker dots believed to represent filler particles present predominantly in the cured elastomer phase have been omitted for clarity.

I claim:

1. A processable rubber composition comprising a cured fluorocarbon elastomer dispersed in a matrix comprising a thermoplastic material, wherein the thermoplastic material comprises a non-fluorine containing thermoplastic polymer,

| Ingredient | Example 17a | | Example 17b | | Example 17c | | Example 17d | | Example 17e | |
|---|---|---|---|---|---|---|---|---|---|---|
| | pphr | g | pphr | g | pphr | g | pphr | g | pphr | g |
| Viton F605C Terpolymer | 100.0 | 232.8 | 100.0 | 202.3 | 100.0 | 160.4 | 100.0 | 132.8 | 100.0 | 113.3 |
| Genestar PA9T | 25.0 | 58.2 | 50.0 | 101.2 | 100.0 | 160.4 | 150.0 | 199.2 | 200.0 | 226.7 |
| Rhenofit CF | 6.0 | 14.0 | 6.0 | 12.1 | 8.0 | 9.6 | 6.0 | 8.0 | 6.0 | 6.8 |
| Elastomag 170 | 3.0 | 7.0 | 3.0 | 6.1 | 3.0 | 4.8 | 3.0 | 4.0 | 3.0 | 3.4 |
| MT Black (N990) | 30.00 | 69.8 | 30.00 | 60.7 | 30.00 | 48.1 | 30.00 | 39.8 | 30.00 | 34.0 |
| Struktol WS-280 | 1.00 | 2.3 | 1.00 | 2.0 | 1.00 | 1.6 | 1.00 | 1.3 | 1.00 | 1.1 |
| Technoflon FPA-1 | 1.00 | 2.3 | 1.00 | 2.0 | 1.00 | 1.6 | 1.00 | 1.3 | 1.00 | 1.1 |

| Ingredient | Example 18a | | Example 18b | | Example 18c | | Example 18d | | Example 18e | |
|---|---|---|---|---|---|---|---|---|---|---|
| | pphr | g | pphr | g | pphr | g | pphr | g | pphr | g |
| Dyneon FE 5840 | 70.0 | 185.3 | 70.0 | 158.2 | 70.0 | 122.4 | 70.0 | 99.8 | 70.0 | 84.3 |
| Dyneon BRE 7231X | 30.0 | 79.4 | 30.0 | 67.3 | 30.0 | 52.6 | 30.0 | 42.8 | 30.0 | 36.1 |
| Genestar PA9T | 25.0 | 66.2 | 50.0 | 113.0 | 100.0 | 174.9 | 150.0 | 213.9 | 200.0 | 240.8 |
| Rhenofit CF | 0.0 | 15.9 | 6.0 | 13.6 | 8.0 | 10.6 | 6.0 | 8.6 | 6.0 | 7.2 |
| Elastomag 170 | 3.0 | 7.9 | 3.0 | 6.8 | 3.0 | 5.2 | 3.0 | 4.3 | 3.0 | 3.6 |
| Austin Black | 30.00 | 26.5 | 30.00 | 22.6 | 30.00 | 17.6 | 30.00 | 14.3 | 30.00 | 12.0 |
| Struktol WS-280 | 1.00 | 2.6 | 1.00 | 2.3 | 1.00 | 1.7 | 1.00 | 1.4 | 1.00 | 1.2 |
| Technoflon FPA-1 | 1.00 | 2.6 | 1.00 | 2.3 | 1.00 | 1.7 | 1.00 | 1.4 | 1.00 | 1.2 |

Example 19

For Example 19, 100 parts of Viton F605 was dynamically vulcanized with 125 parts of Nylon 66 according to the wherein the cured fluorocarbon elastomer is present at a level of greater than or equal to 35% by weight based on the total weight of cured fluorocarbon elastomer and thermoplastic material, and wherein the thermoplastic polymer comprises an amorphous polymer with a glass transition temperature greater than or equal to 150° C.

2. A processable rubber composition comprising a cured fluorocarbon elastomer dispersed in a matrix comprising a thermoplastic material,
wherein the thermoplastic material comprises a non-fluorine containing thermoplastic polymer,
wherein the cured fluorocarbon elastomer is present at a level of greater than or equal to 35% by weight based on the total weight of cured fluorocarbon elastomer and thermoplastic material, and
wherein the thermoplastic polymer comprises a semi-crystalline material having a melting point greater than or equal to 150° C.

3. A composition according to claim 2, wherein the fluorocarbon elastomer comprises repeating units derived from tetrafluoroethylene and propylene.

4. A composition according to claim 2, wherein the thermoplastic material comprises a polyamide.

5. A composition according to claim 2, wherein the thermoplastic material comprises an aromatic polyamide.

6. A composition according to claim 2, wherein the thermoplastic material comprises nylon 66.

7. A composition according to claim 2, wherein the thermoplastic material comprises nylon 6.

8. A composition according to claim 2, wherein the thermoplastic material comprises a polyester.

9. A composition according to claim 2, wherein the thermoplastic material comprises polyethylene terephthalate.

10. A composition according to claim 2, wherein the thermoplastic material comprises polybutylene terephthalate.

11. A composition according to claim 2, wherein the thermoplastic material comprises a polyamide block and a polyether block.

12. A composition according to claim 2, wherein the thermoplastic material comprises a polyester block and a polyether block.

13. A processable rubber composition comprising a cured fluorocarbon elastomer dispersed in a matrix comprising a thermoplastic material,
wherein the thermoplastic material comprises a non-fluorine containing thermoplastic polymer,
wherein the cured fluorocarbon elastomer is present at a level of greater than or equal to 35% by weight based on the total weight of cured fluorocarbon elastomer and thermoplastic material,
wherein the fluorocarbon elastomer comprises repeating units derived from vinylidene fluoride and hexafluoropropylene, and
wherein the thermoplastic polymer comprises an amorphous polymer with a glass transition temperature greater than or equal to 150° C.

14. A processable rubber composition comprising a cured fluorocarbon elastomer dispersed in a matrix comprising a thermoplastic material,
wherein the thermoplastic material comprises a non-fluorine containing thermoplastic polymer,
wherein the cured fluorocarbon elastomer is present at a level of greater than or equal to 35% by weight based on the total weight of cured fluorocarbon elastomer and thermoplastic material,
wherein the cured fluorocarbon elastomer comprises repeating units derived from vinylidene fluoride and hexafluoropropylene, and
wherein the thermoplastic polymer comprises a semi-crystalline material having a melting point greater than or equal to 150° C.

15. A composition according to claim 14, wherein the thermoplastic material comprises a polyamide.

16. A composition according to claim 14, wherein the thermoplastic material comprises an aromatic polyamide.

17. A composition according to claim 14, wherein the thermoplastic material comprises nylon 66.

18. A composition according to claim 14, wherein the thermoplastic material comprises nylon 6.

19. A composition according to claim 14, wherein the thermoplastic material comprises a polyester.

20. A composition according to claim 14, wherein the thermoplastic material comprises polyethylene terephthalate.

21. A composition according to claim 14, wherein the thermoplastic material comprises polybutylene terephthalate.

22. A composition according to claim 14, wherein the thermoplastic material comprises a polyamide block and a polyether block.

23. A composition according to claim 14, wherein the thermoplastic material comprises a polyester block and a polyether block.

24. A processable rubber composition comprising a cured fluorocarbon elastomer dispersed in a matrix comprising a thermoplastic material,
wherein the thermoplastic material comprises a non-fluorine containing thermoplastic polymer,
wherein the cured fluorocarbon elastomer is present at a level of greater than or equal to 35% by weight based on the total weight of cured fluorocarbon elastomer and thermoplastic material,
wherein the fluorocarbon elastomer comprises repeating units derived from tetrafluoroethylene and perfluoroalkyl vinylethers,
wherein the perfluoroalkyl vinylether contains 1 to 6 carbons per perfluoroalkyl group, and
wherein the thermoplastic polymer comprises an amorphous material having a glass transition temperature greater than or equal to 150° C.

25. A processable rubber composition comprising a cured fluorocarbon elastomer dispersed in a matrix comprising a thermoplastic material,
wherein the thermoplastic material comprises a non-fluorine containing thermoplastic polymer,
wherein the cured fluorocarbon elastomer is present at a level of greater than or equal to 35% by weight based on the total weight of cured fluorocarbon elastomer and thermoplastic material,
wherein the fluorocarbon elastomer comprises repeating units derived from tetrafluoroethylene and perfluoroalkyl vinylethers,
wherein the perfluoroalkyl vinylether contains 1 to 6 carbons per perfluoroalkyl group, and
wherein the thermoplastic polymer comprises a semi-crystalline material having a melting point greater than 150° C.

26. A composition according to claim 25, wherein the thermoplastic material comprises a polyamide.

27. A composition according to claim 25, wherein the thermoplastic material comprises an aromatic polyamide.

28. A composition according to claim 25, wherein the thermoplastic material comprises nylon 66.

29. A composition according to claim 25, wherein the thermoplastic material comprises nylon 6.

30. A composition according to claim 25, wherein the thermoplastic material comprises a polyester.

31. A composition according to claim 25, wherein the thermoplastic material comprises polyethylene terephthalate.

32. A composition according to claim 25, wherein the thermoplastic material comprises polybutylene terephthalate.

33. A composition according to claim 25, wherein the thermoplastic material comprises a polyamide block and a polyether block.

34. A composition according to claim 25, wherein the thermoplastic material comprises a polyester block and a polyether block.

* * * * *